UNITED STATES PATENT OFFICE.

EDUARD PÜTTMANN, OF SCHWELM, GERMANY.

PROCESS OF MAKING SPOTTED SHEET-METAL ARTICLES.

SPECIFICATION forming part of Letters Patent No. 555,224, dated February 25, 1896.

Application filed September 3, 1895. Serial No. 561,336. (No specimens.)

*To all whom it may concern:*

Be it known that I, EDUARD PÜTTMANN, manufacturer, a subject of the Emperor of Germany, and a resident of Schwelm, Westphalia, in the Empire of Germany, have invented a new and useful Improved Process of Making Spotted, Spreckled, or Enameled Sheet-Metal Articles with a Single Coating of Enamel, of which the following is a full, clear, and exact description.

The present invention relates to a process of making spotted or spreckled enameled wares, this being effected with but one coating of enamel and at a single burning. Moreover, such spots or spreckles may be applied so as to give a predetermined design or arrangement, or may be made to imitate stone or the like.

I am aware that it is known to make enameled ware by first producing rust spots or molds on the surface of the ware to be enameled, which spots appear in the enameling on the latter being fused; but such procedure is very defective and imperfect, seeing that the wares are not durable on account of those rust-spots which have not properly fused with the coating very readily scaling off and that it is not possible to arrange or distribute the spots or marks so as to produce a predetermined design.

The principal advantages offered by this invention are that no rust whatever is formed, that by using a suitable tool or instrument any desired design may be readily produced on the dry coating of enamel, and that on firing the enamel the spots are at the same time uniformly fused and delicately-graded contours formed.

When a pale or light-colored enamel is used, pottery may be imitated, seeing that any predetermined design may be produced. Such is possible with any of the processes at present in vogue.

This new process is carried out as follows: Borax, soda, or other salt is added to the enamel paste to be applied to the iron ware, which latter is previously cleaned in the usual manner. Such addition causes the coating of enamel when dry to be firm and to have a crust-like surface, which thus facilitates the further treatment of same. After the coating is applied the ware is dried by subjecting same to heat and then the design produced by means of a sponge, felt, (which may have the shape of the design to be produced,) or like absorbent material, or by a brush or by stippling, &c.

The liquid employed for making the spots and the like is composed of water holding ultramarine in suspension. Into this liquid the sponge is dipped and, after squeezing the water well out of same, is used for making the spots, &c., on the dried enamel coating. Seeing that the sponge, after being thus squeezed out, contains very little water, the spots made by same dissolve the salty constituents of the crust-like surface of the enamel coating, and thus the edges of the spots or design run and are delicately graded, as on fancy pottery. The ultramarine remaining on the surface of the dried coating of enamel (which ultramarine, as is known, consists of porcelain-clay, calcined sulphate of sodium, calcined soda, carbon, and sulphur) is so decomposed during the burning or fusing of the enamel that the residuum of same produce dark spots, &c., on the enamel and at the same time a thorough fusing of the spots with the enamel coating is effected, owing to the resulting chemical reaction of the components of the enamel and the ultramarine. The fusing is also thereby promoted. When a very weak ultramarine emulsion is used, the spots made with the sponge on the dried enamel coating may be made more visible, and thus the arrangement of the design facilitated, by adding a pigment—for instance, fuchsine—which is completely consumed during the fusing.

Having now particularly described the nature of this invention and the manner in which the same is to be performed, I declare that what I claim, and wish to secure by Letters Patent, is—

The herein-described process consisting in adding to the enamel paste a salt, applying said paste to the article and drying the coating, then forming the spots on said coating by applying water thereto holding ultramarine in suspension, said water dissolving the salt and running in the coating to produce the graded effect, substantially as described.

In witness whereof I have hereunto signed my name in the presence of two subscribing witnesses.

EDUARD PÜTTMANN.

Witnesses:
T. H. STRAUSS,
A. STRAUSS.